Aug. 18, 1936.　　　F. A. ISAACSON　　　2,051,605
TRUCK
Filed Oct. 17, 1932　　　3 Sheets-Sheet 1
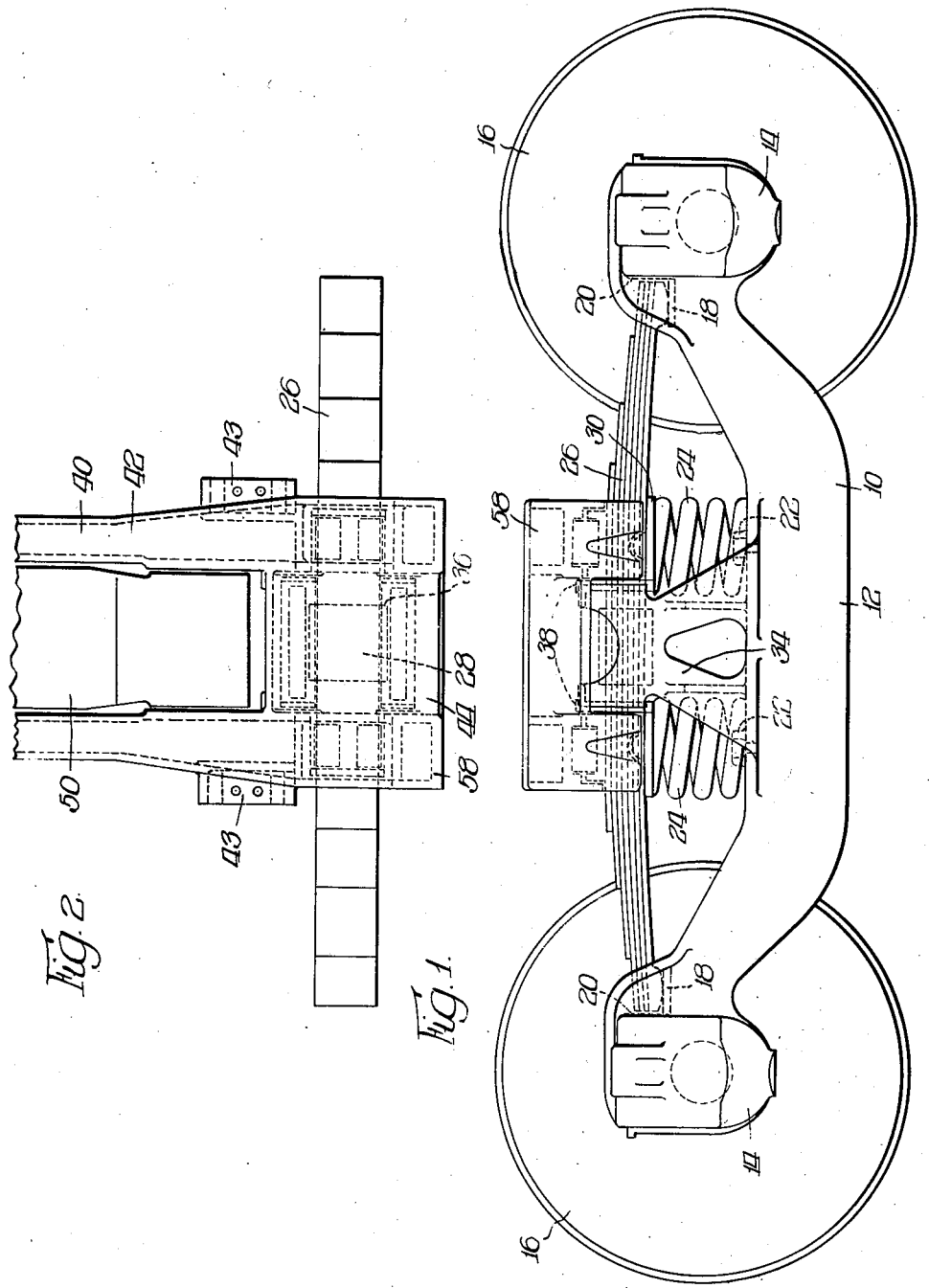

Aug. 18, 1936.     F. A. ISAACSON     2,051,605
TRUCK
Filed Oct. 17, 1932     3 Sheets-Sheet 2
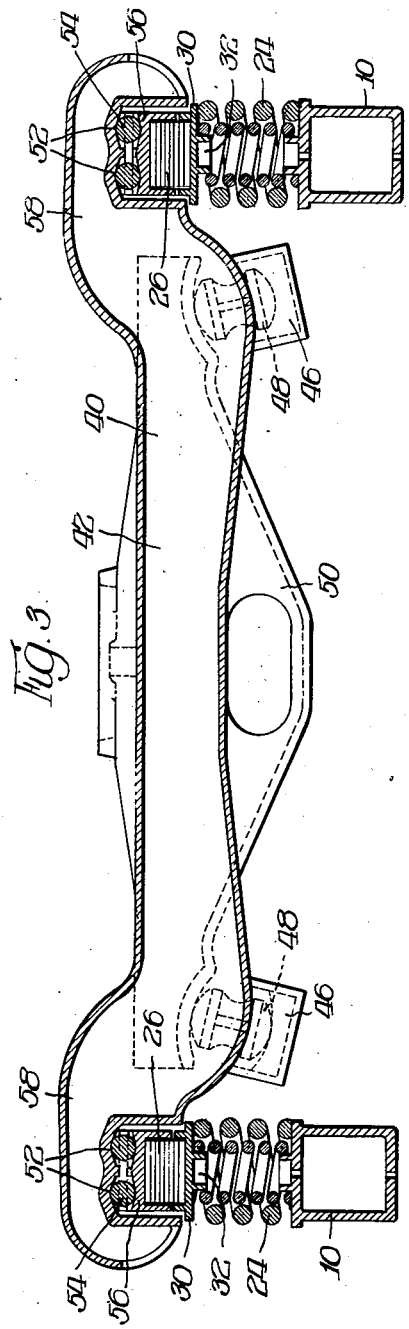
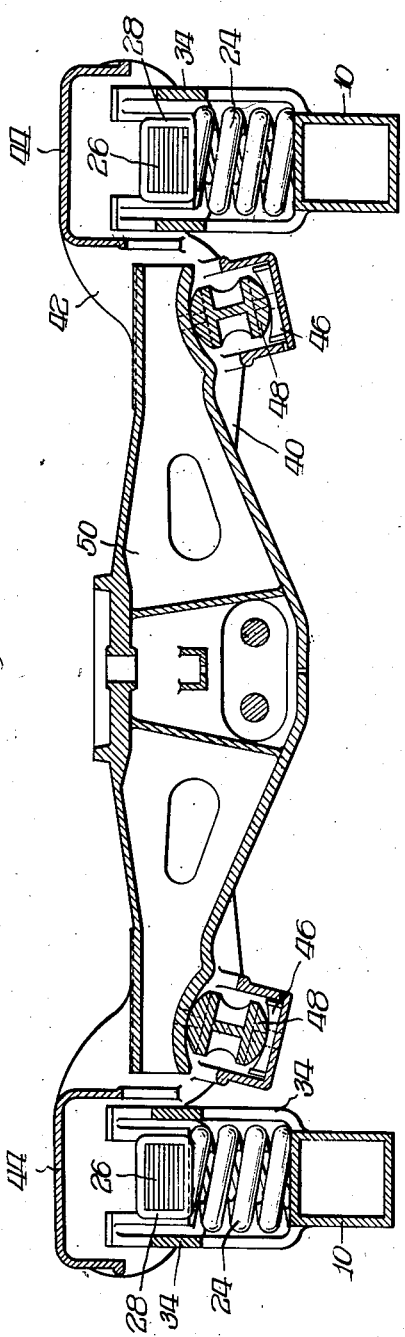
Inventor:
Fred A. Isaacson,
By Wilkinson, Huxley, Byron & Knight
Attys.

Aug. 18, 1936.　　　　　F. A. ISAACSON　　　　　2,051,605
TRUCK
Filed Oct. 17, 1932　　　　　3 Sheets-Sheet 3
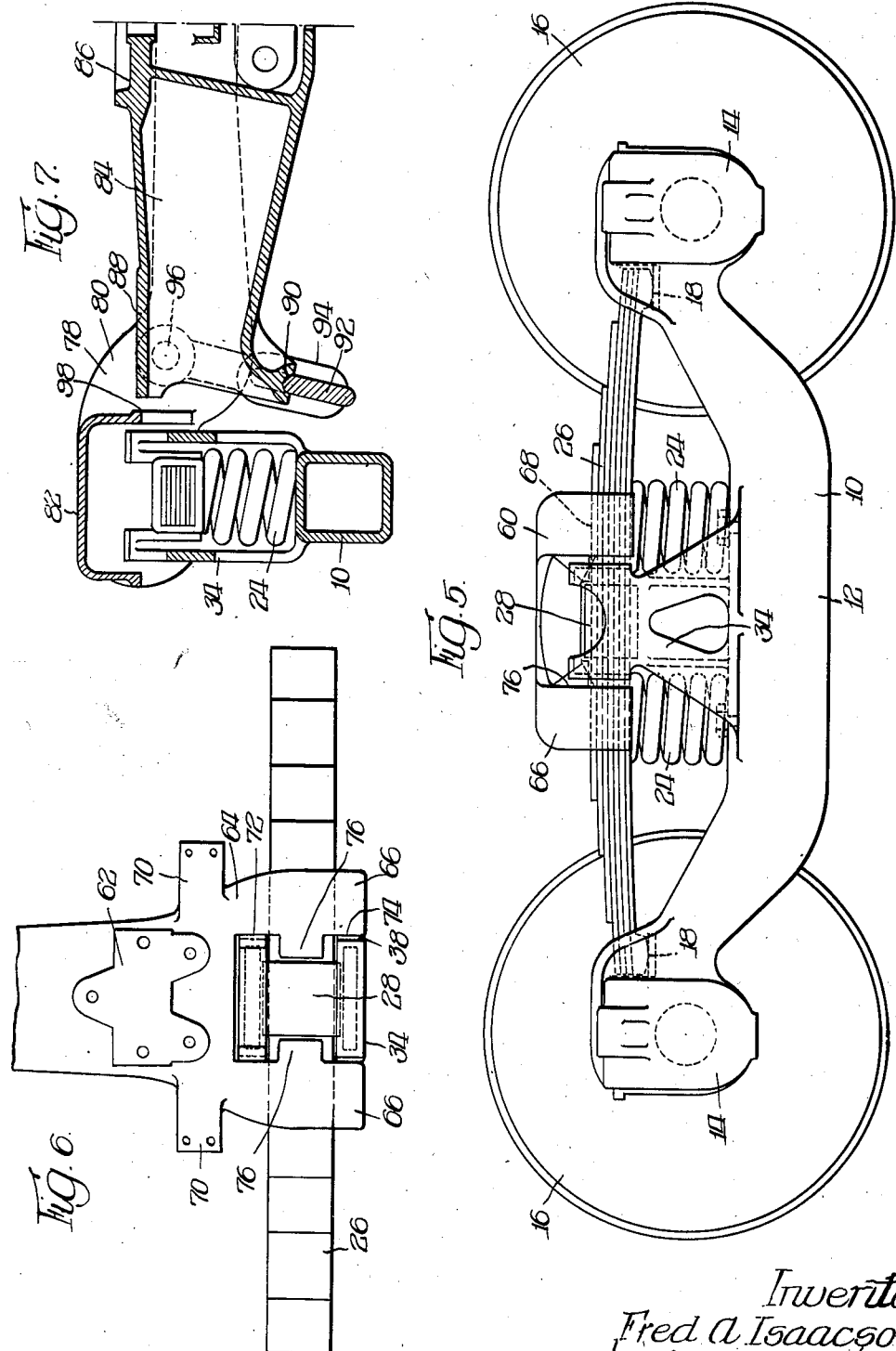
Inventor:
Fred A. Isaacson,
By Wilkinson, Huxley, Byron & Knight
Attys.

Patented Aug. 18, 1936

2,051,605

UNITED STATES PATENT OFFICE 2,051,605

TRUCK

Fred A. Isaacson, Topeka, Kans., assignor to American Steel Foundries, Chicago, Ill., a corporation of New Jersey Application October 17, 1932, Serial No. 638,118

33 Claims. (Cl. 105—197)

This invention pertains to truck construction, and more particularly to four-wheel trucks adapted particularly for high speed freight car use.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series, the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibration without impairing free spring response.

Although the usual passenger car truck with series arrangement of coil and leaf springs gives good riding qualities, it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object is to provide a car truck wherein springs of different character are arranged so that each tends to dampen out the vibrations of the other.

Still another object is to provide spring assemblies wherein there is provided softer cushioning action under light loads, while at the same time providing the necessary stiffness and capacity under heavy loads, these features being combined also to provide a structure which reduces any tendency toward synchronous vibration of the springs.

A yet further object is to provide a truck construction wherein the load carrying member is supported on the side frame by resilient members of different characteristics and so arranged that certain of the resilient members support a greater portion of the load than other of the resilient members.

A still further object is to provide a truck construction wherein a single beam side frame is provided having thrust columns cooperating with the load carrying member, said load carrying member being supported on springs arranged in series-parallel.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a side elevation of a truck construction embodying the invention;

Figure 2 is a fragmentary top plan view of the truck construction shown in Figure 1;

Figure 3 is a transverse sectional elevation of the truck construction shown in Figures 1 and 2, the section being taken substantially in a plane passing through the centers of the coil spring assemblies;

Figure 4 is a transverse sectional elevation taken substantially in the plane passing through the transverse center line of the truck constructions and coil springs illustrated in Figures 1 and 2;

Figure 5 is a side elevation of a modified form of truck construction embodying the invention;

Figure 6 is a fragmentary top plan view of the construction shown in Figure 5;

Figure 7 is a transverse sectional elevation taken substantially in the plane of the transverse center line of the truck of still another modified form of truck embodying the invention.

In the truck constructions illustrated, the side frame 10 consists of a single beam member 12 provided adjacent the ends thereof with the journal boxes 14, said journal boxes being adapted to have cooperative relation with the journal ends of the wheel and axle assemblies 16. The side frame adjacent the journal boxes is provided with the leaf spring seats 18 disposed adjacent end thrust means 20 provided adjacent the journal boxes, the side frame being depressed intermediate the ends thereof and provided with the upstanding dowels 22 defining coil spring seats for accommodating coil springs 24. The semi-elliptic leaf spring assembly 26 is supported on the seats 18 and extends longitudinally of the side frame, being provided adjacent the center thereof with the spring band 28.

In the construction shown in Figure 1, the leaf spring 26 rests upon spring caps 30 seated on the coil spring assemblies 24, suitable positioning dowels 32 being provided.

In the constructions illustrated in Figures 5, 6 and 7, the coil spring assemblies 24 directly engage the underside of the leaf spring assembly 26 at spaced points on either side of the spring band 28.

The side frame 10 is provided adjacent the center thereof with the spaced columns 34 spaced apart sufficiently to clear the leaf spring 26 and being widened as at 36 to accommodate the spring band 28. These columns are provided with wear plates 38 having sliding cooperation with column cooperating members provided on the adjacent load carrying member.

In the construction shown in Figures 1 to 4 inclusive, the transom 40 is provided, the transom including the spaced members 42 provided with brake hanger brackets 43 and connected adjacent the ends thereof by the integral member 44. The transom members 42 are connected adjacent the side frames by means of the roller tracks 46, said tracks being adapted to accommodate the rollers 48 serving to support the bolster 50 whereby the bolster is rockably supported on the transom. The transom is also provided with other roller tracks 52 accommodating the rollers 54, said rollers being supported on complementary tracks formed on the track member 56 supported on the leaf spring 26 in vertical alignment with the coil springs and also with the spring cap 30. The transom is provided with the yokes 58 embracing the spring 26 and also the members 30 and 56, and the transom and the member 56 are provided with portions having bearing engagement with the wear plates 38.

In the constructions shown in Figures 5 and 6, the bolster 60 provided with suitable center and side bearings 62 is bifurcated adjacent the end thereof as at 64, being provided with the yoke portions 66. Said yoke portions are each provided with seats 68 adapted to engage the leaf spring 26 to directly support the bolster on the leaf spring, the seats 68 being preferably arranged in vertical alignment with the coil springs 24. The bolster is provided with brake hanger brackets 70, it being understood that the side frame may also be provided with end brackets such as shown in application Serial No. 593,954, Oelkers, filed February 19, 1932, and the yokes are each provided with spaced column cooperating portions 72 and 74 having sliding cooperation with the wear plates 38 provided on the spaced columns 34. The yokes intermediate the surfaces 62 and 64 are provided with inwardly extending lugs 76 disposed adjacent the spring band 28 for aiding in positioning the bolster with respect to the leaf spring.

In the construction shown in Figure 7, the transom 78 is similar to the transom 40, with the exception that it is directly supported on the leaf spring in a manner already described with respect to the bolster shown in Figures 5 and 6. The spaced members 80 of said transom, however, are connected by means of the end member 82. In this case the bolster 84 is provided with the center bearing 86, the side bearing 88, and the swing hanger seat 90 disposed on the lower chord thereof, the bolster being similar to that described in application Serial No. 470,318, Oelkers, filed July 24, 1930. The seat 90 has engagement with the connecting member 92 between the swing hangers 94, the swing hangers being pivoted as at 96 to the spaced members 80 of the transom whereby lateral motion is provided, a stop 98 being provided on the transom for limiting this lateral movement, the disposition of the swing hangers being such as to provide a self-centering bolster arrangement.

In the construction shown, the drive or thrust longitudinally of the side frame is transmitted through the load carrying member to the columns and thence to the side frame, whereby relieving the leaf spring of any such drive. Vertical motion and/or lateral motion is provided in the constructions shown where necessary.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a truck, the combination of spaced wheel and axle assemblies, a lower rigid member disposed between and connecting said assemblies, an upper substantially flat flexible member supported by said rigid member, a bolster supported on and engaging said flexible member, and means on said rigid member intermediate the ends of said flexible member, having cooperative relation with said bolster for taking the thrust from said bolster.

2. In a truck, the combination of spaced wheel and axle assemblies, a lower rigid member disposed between and connecting said assemblies, an upper flexible member engaging said rigid member, a bolster supported on said flexible member, resilient means disposed between said flexible and rigid members, and column members embracing said flexible member and cooperating with said bolster for accommodating end thrusts therefrom.

3. In a truck, the combination of a side frame, spaced wheel and axle assemblies associated therewith, a bolster, a longitudinally disposed leaf spring between said bolster and side frame, spaced coil springs between said leaf spring and side frame, said bolster being provided with portions for transmitting the load to said leaf spring, said portions being aligned substantially with said coil springs, and column members disposed between said coil springs embracing said leaf spring and cooperating with column means on said bolster.

4. In a truck, the combination of a side frame, spaced wheel and axle assemblies associated therewith, a load carrying member, a longitudinally disposed leaf spring between said load carrying member and side frame, spaced coil springs between said leaf spring and side frame, said load carrying member being provided with portions for transmitting the load to said leaf spring, said portions being aligned substantially with said coil springs, and column members disposed between said coil springs embracing said leaf spring and cooperating with column means on said load carrying member.

5. In a truck, the combination of a side frame provided with journal boxes having cooperative engagement with wheel and axle assemblies, spring seats adjacent said journal boxes, a longitudinally disposed leaf spring supported by said spring seats, spaced coil springs interposed between said side frame and said leaf spring, a transom supported for lateral movement on said leaf spring at points substantially in alignment with said coil springs, and a bolster mounted for lateral movement on said transom.

6. In a truck, the combination of a side frame provided with journal boxes having cooperative engagement with wheel and axle assemblies, spring seats adjacent said journal boxes, a longitudinally disposed leaf spring supported by said spring seats, spaced coil springs interposed between said side frame and said leaf spring, column members disposed between said coil springs and embracing said leaf spring, a transom having column cooperating members supported on said leaf spring at points substantially in alignment with said coil springs, and a bolster mounted for lateral movement on said transom.

7. In a truck, the combination of a side frame provided with journal boxes having cooperative engagement with wheel and axle assemblies, spring seats adjacent said journal boxes, a longitudinally disposed leaf spring supported by said spring seats, spaced coil springs interposed between said side frame and said leaf spring, a transom supported for lateral movement on said leaf spring at points substantially in alignment with said coil springs, and a bolster mounted for lateral movement on said transom.

8. In a truck, the combination of a side frame provided with journal boxes having cooperative engagement with wheel and axle assemblies, spring seats adjacent said journal boxes, a longitudinally disposed leaf spring supported by said spring seats, spaced coil springs interposed between said side frame and said leaf spring, column members disposed between said coil springs and embracing said leaf spring, a transom having column cooperating members and supported for lateral movement on said leaf spring at points substantially in alignment with said coil springs, and a bolster mounted for lateral movement on said transom.

9. In a truck, the combination of a side frame provided with journal boxes having cooperative engagement with wheel and axle assemblies, spring seats adjacent said journal boxes, a longitudinally disposed leaf spring supported by said spring seats, spaced coil springs interposed between said side frame and said leaf spring, column members disposed between said coil springs and embracing said leaf spring, a transom having column cooperating members and supported on said leaf spring at points substantially in alignment with said coil springs, and a bolster mounted on lateral motion rollers on said transom.

10. In a truck, the combination of a side frame provided with journal boxes having cooperative engagement with wheel and axle assemblies, spring seats adjacent said journal boxes, a longitudinally disposed leaf spring supported by said spring seats, spaced coil springs interposed between said side frame and said leaf spring, column members disposed between said coil springs and embracing said leaf spring, a transom having column cooperating members and supported on said leaf spring at points substantially in alignment with said coil springs, and a bolster mounted on lateral motion swing hangers pivoted to said transom.

11. In a truck, the combination of a side frame provided with journal boxes having cooperative engagement with wheel and axle assemblies, spring seats adjacent said journal boxes, a longitudinally disposed leaf spring supported by said spring seats, spaced coil springs interposed between said side frame and said leaf spring, column members disposed between said coil springs and embracing said leaf spring, a transom having column cooperating members and supported for lateral movement on said leaf spring at points substantially in alignment with said coil springs, and a bolster mounted on lateral motion rollers on said transom.

12. In a truck, the combination of a side frame provided with journal boxes having cooperative engagement with wheel and axle assemblies, spring seats adjacent said journal boxes, a longitudinally disposed leaf spring supported by said spring seats, spaced coil springs interposed between said side frame and said leaf spring, column members disposed between said coil springs and embracing said leaf spring, a transom having column cooperating members and supported for lateral movement on said leaf spring at points substantially in alignment with said coil springs, and a bolster mounted on lateral motion swing hangers pivoted to said transom.

13. In a truck, the combination of a side frame including a single beam member having journal boxes adjacent the ends thereof, spring seats provided on said beam member adjacent said journal boxes, a leaf spring extending longitudinally of said truck and having the ends thereof seated on said seats, a load carrying member seated on said spring and having a bifurcated end providing facing column cooperating surfaces, and a column provided on said side frame and extending within said bifurcated end, said column having column guides cooperating with said surfaces.

14. In a truck, the combination of a side frame including a single beam member having journal boxes adjacent the ends thereof, spring seats provided on said beam member adjacent said journal boxes, a leaf spring extending longitudinally of said truck and having the ends thereof seated on said seats, a load carrying member seated for lateral motion on said spring and having a bifurcated end providing facing column cooperating surfaces, and a column provided on said side frame and extending within said bifurcated end, said column having column guides cooperating with said surfaces.

15. In a truck, the combination of a side frame including a single beam member having journal boxes adjacent the ends thereof, spring seats provided on said beam member adjacent said journal boxes, a leaf spring extending longitudinally of said truck and having the ends thereof seated on said seats, a load carrying member seated at spaced points on said spring and having a bifurcated end providing facing column cooperating surfaces, and a column provided on said side frame and extending within said bifurcated end, said column having column guides cooperating with said surfaces.

16. In a truck, the combination of a side frame including a single beam member having journal boxes adjacent the ends thereof, spring seats provided on said beam member adjacent said journal boxes, a leaf spring extending longitudinally of said truck and having the ends thereof seated on said seats, a load carrying member seated for lateral motion at spaced points on said spring and having a bifurcated end providing facing column cooperating surfaces, and a column provided on said side frame and extending within said bifurcated end, said column having column guides cooperating with said surfaces.

17. In a bolster, the combination of tension and compression members and connecting side members forming substantially a box shaped section, central and side bearings provided on said compression member, said bolster having bifurcated ends providing spaced seats, said ends being provided with spaced facing lugs within the bifurcation forming positioning means adapted to have cooperative engagement with a spring band.

18. In a bolster, the combination of tension and compression members and connecting side members forming substantially a box shaped section, central and side bearings provided on said compression member, said bolster having bifurcated ends providing spaced seats, said ends being provided with spaced facing lugs within the bifurcation forming positioning means adapted to have cooperative engagement with a spring band, and brake hanger brackets disposed between said bifurcated ends and said side bearings.

19. In a bolster, the combination of tension and compression members and connecting side members forming substantially a box shaped section, central and side bearings provided on said compression member, said bolster having bifurcated ends providing spaced seats, said ends being provided with spaced facing lugs within the bifurcation forming positioning means adapted to have cooperative engagement with a spring band, and oppositely facing brake hanger brackets disposed between said bifurcated ends and said central bearing.

20. In a bolster, the combination of tension and compression members and connecting side members forming substantially a box shaped section, central and side bearings provided on said compression member, said bolster being provided with bifurcated ends having spaced spring seats thereon, said ends having positioning lugs extending toward each other and column guide cooperating surfaces provided on said ends on each side of said lugs.

21. In a bolster, the combination of tension and compression members and a connecting member provided therebetween, central and side bearings on said compression member, said bolster being provided with bifurcated ends, the bifurcated ends being formed by spaced arms, each arm being provided with inwardly disposed positioning lugs and a column guide cooperating surface provided on each of said arms on each side of each of said lugs.

22. In a load carrying member, the combination of a body portion provided with bifurcated ends including spaced arms provided each with a spring seat and inwardly disposed positioning lugs, and a column guide cooperating surface provided on each of said arms on each side of each of said lugs.

23. In a side frame, the combination of a single beam member substantially of box section depressed intermediate the ends thereof to form a spring seat, journal boxes disposed adjacent the ends of said side frame, spring seats disposed adjacent said journal boxes and a column member provided on said beam member adjacent said first named spring seat.

24. In a side frame, the combination of a single beam member substantially of box section depressed intermediate the ends thereof to form a spring seat, journal boxes disposed adjacent the ends of said side frame, spring seats disposed adjacent said journal boxes and spaced column members provided on said beam member adjacent and embracing said first named spring seat.

25. In a side frame, the combination of a single beam member substantially of box section depressed intermediate the ends thereof to form a spring seat, journal boxes disposed adjacent the ends of said side frame, spring seats disposed adjacent said journal boxes and a column member provided on said beam member adjacent one of said spring seats.

26. In a side frame, the combination of a single beam member substantially of box section depressed intermediate the ends thereof to form a spring seat, journal boxes disposed adjacent the ends of said side frame, spring seats disposed adjacent said journal boxes and spaced column members provided on said beam member adjacent one of said spring seats.

27. In a truck, the combination of a side frame provided with journal boxes having cooperative engagement with wheel and axle assemblies, spring seats adjacent said journal boxes, a longitudinally disposed leaf spring supported by said spring seats, spaced coil springs interposed between said side frame and said leaf spring, a transom supported for lateral movement on said leaf spring at points substantially in alignment with said coil springs, and a bolster mounted on said transom.

28. In a truck, the combination of a side frame provided with journal boxes having cooperative engagement with wheel and axle assemblies, spring seats adjacent said journal boxes, a longitudinally disposed leaf spring supported by said spring seats, spaced coil springs interposed between said side frame and said leaf spring, column members disposed between said coil springs and embracing said leaf spring, a transom having column cooperating members supported on said leaf spring at points substantially in alignment with said coil springs, and a bolster mounted on said transom.

29. In a truck, the combination of a side frame provided with journal boxes having cooperative engagement with wheel and axle assemblies, spring seats adjacent said journal boxes, a longitudinally disposed leaf spring supported by said spring seats, spaced coil springs interposed between said side frame and said leaf spring, a transom supported for lateral movement on said leaf spring at points substantially in alignment with said coil springs, and a bolster mounted on said transom.

30. In a truck, the combination of a side frame provided with journal boxes having cooperative engagement with wheel and axle assemblies, spring seats adjacent said journal boxes, a longitudinally disposed leaf spring supported by said spring seats, spaced coil springs interposed between said side frame and said leaf spring, column members disposed between said coil springs and embracing said leaf spring, a transom having column cooperating members and supported for lateral movement on said leaf spring at points substantially in alignment with said coil springs, and a bolster mounted on said transom.

31. In a truck, the combination of spaced wheel and axle assemblies, a lower rigid member disposed between and connecting said assemblies, an upper substantially flat flexible member supported by said lower rigid member, a load-carrying member supported on and engaging said flexible member, and means on said rigid member intermediate the ends of said flexible member having cooperative relation with said load-carrying member for taking the thrust of said load-carrying member.

32. In a truck, the combination of spaced wheel and axle assemblies, a lower rigid member disposed between and connecting said assemblies, an upper substantially flat flexible member supported by said lower rigid member, a bolster supported on and engaging said flexible member, and means on said rigid member having cooperative relation with said bolster for taking the thrust of said bolster in the direction of the longitudinal axis of said flexible member.

33. In a truck, the combination of spaced wheel and axle assemblies, a lower rigid member disposed between and connecting said assemblies, an upper flexible member supported by said lower rigid member, a bolster supported on and engaging said flexible member, and means on said rigid member having cooperative relation with said bolster for taking the thrust of said bolster in the direction of the longitudinal axis of said flexible member.

FRED A. ISAACSON.